United States Patent
Durkee et al.

(10) Patent No.: US 11,397,910 B2
(45) Date of Patent: Jul. 26, 2022

(54) SYSTEM AND METHOD FOR PRODUCT RECOGNITION AND ASSIGNMENT AT AN AUTOMATED STORAGE AND RETRIEVAL DEVICE

(71) Applicant: Walmart Apollo, LLC, Bentonville, AR (US)

(72) Inventors: Paul Edward Durkee, Centerton, AR (US); Edwin H. Reed, Bentonville, AR (US); Stuart William Clark, Centerton, AR (US); Bradley Johnson, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 256 days.

(21) Appl. No.: 16/510,114

(22) Filed: Jul. 12, 2019

(65) Prior Publication Data
US 2021/0004758 A1 Jan. 7, 2021

Related U.S. Application Data

(60) Provisional application No. 62/697,094, filed on Jul. 12, 2018.

(51) Int. Cl.
*G06Q 10/08* (2012.01)

(52) U.S. Cl.
CPC ..... *G06Q 10/0833* (2013.01); *G06Q 10/0832* (2013.01); *G06Q 10/0835* (2013.01); *G06Q 10/0836* (2013.01)

(58) Field of Classification Search
None
See application file for complete search history.

(56) References Cited

U.S. PATENT DOCUMENTS

| | | |
|---|---|---|
| 3,737,057 A | 6/1973 | Neumann |
| 5,065,872 A | 11/1991 | Simon |
| 5,337,920 A | 8/1994 | Clausen |
| 5,478,182 A | 12/1995 | Hildebrand |
| 5,568,393 A | 10/1996 | Ando |

(Continued)

FOREIGN PATENT DOCUMENTS

| | | |
|---|---|---|
| CN | 106942915 A | 7/2017 |
| CN | 107346590 | 11/2017 |
| CN | 107454863 | 12/2017 |
| CN | 107814122 | 3/2018 |
| DE | 4339056 | 5/1995 |
| EM | 0021045470001 | 9/2012 |

(Continued)

OTHER PUBLICATIONS

Vidmar, Stanley, Tower System provides automated storage and retrieval., Mar. 30, 2005, https://news.thomasnet.com/fullstory/tower-system-provides-automated-storage-and-retrieval-461698 (Year: 2005).*

(Continued)

*Primary Examiner* — Emmett K. Walsh
*Assistant Examiner* — Larita L. Yusuf
(74) *Attorney, Agent, or Firm* — Fitch, Even, Tabin & Flannery, LLP (57) ABSTRACT

Systems, methods, and machine-readable media are provided for processing items within an automated storage and retrieval device. A scanned machine-readable identifier associated with an item is received at an automated storage and retrieval device. A determination is made whether the machine-readable identifier that was scanned is a container identification (ID). The machine-readable identifier is identified based on pre-defined criteria when the machine-readable identifier is determined not to be a container ID. The machine-readable identifier is mapped to an existing order using stored order information. A container ID is created by the fulfillment system and passed back to the automated storage and retrieval device. The item is stored in the automated storage and retrieval device using the created container ID.

20 Claims, 4 Drawing Sheets

(56) References Cited

U.S. PATENT DOCUMENTS

| | | | |
|---|---|---|---|
| 5,593,269 A | 1/1997 | Bernard, II | |
| 5,674,040 A | 10/1997 | Wagner | |
| 6,224,313 B1 | 5/2001 | Fukushima | |
| 6,325,775 B1 | 12/2001 | Thom | |
| 6,409,449 B1 | 6/2002 | Freudelsperger | |
| 6,416,270 B1 | 7/2002 | Steury | |
| 6,443,317 B1 | 9/2002 | Brozak, Jr. | |
| 6,598,829 B2 | 7/2003 | Kamstra | |
| 6,694,217 B2 | 2/2004 | Bloom | |
| 6,783,058 B2 | 8/2004 | Quaintance | |
| 6,845,873 B1 | 1/2005 | Chattey | |
| 6,882,269 B2 | 4/2005 | Moreno | |
| 7,010,501 B1 | 3/2006 | Roslak | |
| 7,013,198 B2 | 3/2006 | Haas | |
| 7,086,558 B1 | 8/2006 | Pixley | |
| 7,106,202 B2 | 9/2006 | Dickinson | |
| 7,324,921 B2 | 1/2008 | Sugahara | |
| 7,360,042 B2 | 4/2008 | Chen | |
| 8,145,351 B2 | 3/2012 | Schininger | |
| 8,502,644 B1* | 8/2013 | Newman | G06Q 10/0833 |
| | | | 340/8.1 |
| 8,560,406 B1 | 10/2013 | Antony | |
| 8,755,930 B2 | 6/2014 | Miller | |
| 8,882,432 B2 | 11/2014 | Bastianii | |
| 8,920,098 B2 | 12/2014 | Hänel | |
| 9,052,992 B2 | 6/2015 | Irwin | |
| 9,082,247 B2 | 7/2015 | Turner | |
| 9,120,524 B2 | 9/2015 | Ozaki | |
| 9,120,624 B1 | 9/2015 | Cassady et al. | |
| 9,230,230 B2 | 1/2016 | Gupta | |
| 9,242,810 B2 | 1/2016 | Lossov | |
| 9,443,372 B2 | 9/2016 | Mockus | |
| 9,482,522 B2 | 11/2016 | Motoyama | |
| 9,516,974 B2 | 12/2016 | Herling | |
| 9,517,296 B2 | 12/2016 | Fulkerson | |
| 9,604,259 B2 | 3/2017 | Lossov et al. | |
| 9,646,280 B2 | 5/2017 | Thomas | |
| 9,821,960 B2 | 11/2017 | Issing | |
| 9,830,572 B2 | 11/2017 | Wan | |
| 10,019,593 B1 | 7/2018 | Patel | |
| 10,019,693 B2 | 7/2018 | Wolf | |
| 10,114,996 B2 | 10/2018 | Lossov | |
| 10,303,133 B1 | 5/2019 | Dhalla | |
| 10,357,804 B2 | 7/2019 | Must | |
| 10,621,401 B2 | 4/2020 | Lossov | |
| 2002/0032501 A1 | 3/2002 | Tilles | |
| 2002/0035515 A1* | 3/2002 | Moreno | G07F 9/105 |
| | | | 340/5.73 |
| 2002/0165787 A1 | 11/2002 | Bates | |
| 2003/0038097 A1 | 2/2003 | Palder | |
| 2003/0046166 A1 | 3/2003 | Liebman | |
| 2003/0065421 A1 | 4/2003 | Didriksen | |
| 2003/0065898 A1 | 4/2003 | Flamma | |
| 2004/0037680 A1 | 2/2004 | Sato | |
| 2004/0069572 A1 | 4/2004 | Jaspers | |
| 2004/0175258 A1 | 9/2004 | Haas | |
| 2004/0238326 A1 | 12/2004 | Lichti | |
| 2005/0000974 A1 | 1/2005 | Chirnomas | |
| 2005/0021173 A1 | 1/2005 | Pinney et al. | |
| 2005/0053450 A1 | 3/2005 | Kantola | |
| 2005/0211768 A1 | 9/2005 | Stillman | |
| 2006/0045660 A1 | 3/2006 | Di Rosa | |
| 2007/0025830 A1 | 2/2007 | Solomon | |
| 2007/0032903 A1 | 2/2007 | Tsujimoto | |
| 2007/0150375 A1 | 6/2007 | Yang | |
| 2007/0187183 A1 | 8/2007 | Saigh | |
| 2007/0293978 A1 | 12/2007 | Wurman | |
| 2008/0135574 A1 | 6/2008 | Hieb et al. | |
| 2008/0260504 A1 | 10/2008 | Gifford | |
| 2009/0211962 A1 | 8/2009 | Min | |
| 2010/0076591 A1 | 3/2010 | Johng | |
| 2010/0138037 A1 | 6/2010 | Adelberg | |
| 2010/0253190 A1 | 10/2010 | Li | |
| 2011/0178633 A1* | 7/2011 | Marrese | G06Q 10/087 |
| | | | 700/229 |
| 2012/0024160 A1 | 2/2012 | Van Os | |
| 2012/0027547 A1 | 2/2012 | Jaeger | |
| 2012/0123587 A1 | 5/2012 | Mockus | |
| 2012/0303154 A1 | 11/2012 | Stiernagle | |
| 2013/0092700 A1 | 4/2013 | Braunstein | |
| 2013/0131863 A1 | 5/2013 | Hoersten et al. | |
| 2013/0167311 A1 | 7/2013 | Johnson | |
| 2013/0184854 A1 | 7/2013 | Bastian, II | |
| 2013/0238115 A1 | 9/2013 | Smith | |
| 2014/0021253 A1 | 1/2014 | Carson et al. | |
| 2014/0037404 A1 | 2/2014 | Hancock | |
| 2014/0079518 A1 | 3/2014 | Qi | |
| 2014/0089085 A1 | 3/2014 | Mueller | |
| 2014/0100942 A1 | 4/2014 | Konevic | |
| 2014/0190914 A1 | 7/2014 | Nagel | |
| 2014/0278603 A1 | 9/2014 | Lievens | |
| 2014/0316916 A1 | 10/2014 | Hay | |
| 2014/0330603 A1 | 11/2014 | Corder | |
| 2015/0032252 A1 | 1/2015 | Galluzzo | |
| 2015/0088731 A1 | 3/2015 | Ackerman | |
| 2015/0106291 A1 | 4/2015 | Robinson | |
| 2015/0106295 A1 | 4/2015 | Robinson | |
| 2015/0106296 A1 | 4/2015 | Robinson et al. | |
| 2015/0120094 A1 | 4/2015 | Kimchi et al. | |
| 2015/0120602 A1 | 4/2015 | Huffman | |
| 2015/0158679 A1 | 6/2015 | Lossov | |
| 2015/0186840 A1 | 7/2015 | Torres | |
| 2015/0265124 A1 | 9/2015 | Chen | |
| 2015/0266672 A1 | 9/2015 | Lert | |
| 2015/0310694 A1 | 10/2015 | Will | |
| 2015/0339625 A1 | 11/2015 | Agasti | |
| 2015/0343494 A1 | 12/2015 | Lossov | |
| 2015/0356664 A1 | 12/2015 | Mackler | |
| 2015/0371187 A1 | 12/2015 | Irwin | |
| 2015/0379464 A1 | 12/2015 | Turner | |
| 2015/0379554 A1 | 12/2015 | Copeland | |
| 2016/0125508 A1 | 5/2016 | Carr | |
| 2016/0130086 A1 | 5/2016 | Yamashita | |
| 2016/0194152 A1 | 7/2016 | Lo Iacono | |
| 2016/0229633 A1 | 8/2016 | Yamashita | |
| 2016/0236865 A1 | 8/2016 | Altemir | |
| 2016/0247702 A1 | 8/2016 | Adachi | |
| 2016/0327941 A1 | 11/2016 | Stiernagle | |
| 2017/0010609 A1 | 1/2017 | High | |
| 2017/0073159 A1 | 3/2017 | Lossov et al. | |
| 2017/0088355 A1 | 3/2017 | Khodl | |
| 2017/0091704 A1 | 3/2017 | Wolf | |
| 2017/0091710 A1 | 3/2017 | Van Dyke | |
| 2017/0124547 A1 | 5/2017 | Natarajan | |
| 2017/0147975 A1 | 5/2017 | Natarajan et al. | |
| 2017/0323250 A1 | 11/2017 | Lindbo | |
| 2018/0014438 A1 | 1/2018 | Bilato | |
| 2018/0041493 A1 | 2/2018 | Wilkinson | |
| 2018/0060812 A1 | 3/2018 | Robinson | |
| 2018/0089619 A1 | 3/2018 | High et al. | |
| 2018/0130017 A1 | 5/2018 | Gupte | |
| 2018/0135337 A1 | 5/2018 | Johnson et al. | |
| 2018/0144296 A1 | 5/2018 | Engel et al. | |
| 2018/0172799 A1 | 6/2018 | Meadow | |
| 2018/0174101 A1 | 6/2018 | Mattingly | |
| 2018/0177318 A1 | 6/2018 | Chambers | |
| 2018/0186454 A1 | 7/2018 | Luckay | |
| 2018/0190062 A1 | 7/2018 | Robinson | |
| 2018/0244469 A1 | 8/2018 | Testa | |
| 2018/0305125 A1 | 10/2018 | Guo | |
| 2018/0365641 A1 | 12/2018 | Zhu | |
| 2019/0012639 A1* | 1/2019 | Boothman | G06Q 10/0838 |
| 2019/0024302 A1* | 1/2019 | Jang | G06K 19/027 |
| 2019/0031441 A1 | 1/2019 | Jin | |
| 2019/0112119 A1 | 4/2019 | Alexander | |
| 2019/0114585 A1* | 4/2019 | Fee | G07C 9/00182 |
| 2019/0114859 A1 | 4/2019 | Fee | |
| 2019/0188936 A1 | 6/2019 | Sivill | |
| 2019/0213540 A1 | 7/2019 | Petroski | |
| 2019/0220815 A1 | 7/2019 | Nelson | |
| 2019/0313828 A1 | 10/2019 | Schmider | |
| 2019/0337719 A1 | 11/2019 | Tovey | |
| 2019/0344965 A1 | 11/2019 | Wilkinson | |
| 2019/0352095 A1 | 11/2019 | Tovey | |

(56) References Cited

U.S. PATENT DOCUMENTS

| | | | |
|---|---|---|---|
| 2019/0370744 | A1 | 12/2019 | Fee |
| 2019/0375594 | A1 | 12/2019 | Tovey |
| 2020/0002093 | A1 | 1/2020 | Tovey |
| 2020/0005226 | A1* | 1/2020 | Sikka ............... G06Q 10/087 |
| 2020/0012245 | A1 | 1/2020 | Marin Pulido |
| 2020/0017298 | A1 | 1/2020 | Durkee |
| 2020/0017299 | A1 | 1/2020 | Durkee |
| 2020/0017300 | A1 | 1/2020 | Durkee |
| 2020/0019929 | A1 | 1/2020 | Chaney |
| 2020/0172337 | A1 | 6/2020 | Wilkinson |
| 2020/0193373 | A1 | 6/2020 | Varman |
| 2020/0226539 | A1 | 7/2020 | Durkee |
| 2020/0239229 | A1 | 7/2020 | Tovey |
| 2020/0250615 | A1 | 8/2020 | Fee |
| 2020/0293990 | A1 | 9/2020 | Mak |
| 2020/0317446 | A1 | 10/2020 | Tovey |
| 2020/0394375 | A1 | 12/2020 | Lössov |

FOREIGN PATENT DOCUMENTS

| | | | |
|---|---|---|---|
| EM | 0027572450001 | | 8/2015 |
| EM | 0027572450002 | | 8/2015 |
| EM | 0027572450003 | | 8/2015 |
| EM | 0036406890001 | | 1/2017 |
| EM | 0037930660001 | | 3/2017 |
| EM | 0034029650001 | | 7/2017 |
| EM | 0041697610001 | | 8/2017 |
| EP | 2881905 | | 6/2015 |
| EP | 2950282 | | 12/2015 |
| EP | 3142085 | | 3/2017 |
| EP | 3255596 | | 12/2017 |
| GB | 2175575 | A | 12/1986 |
| GB | 2409748 | | 7/2005 |
| GB | 2430608 | | 4/2007 |
| GB | 2430705 | | 4/2007 |
| GB | 2437967 | | 11/2007 |
| GB | 2491340 | | 12/2012 |
| GB | 2564313 | | 1/2019 |
| GB | 2590246 | | 6/2021 |
| GB | 2590248 | | 6/2021 |
| GB | 2590267 | | 6/2021 |
| GB | 2590268 | | 6/2021 |
| WO | 1995011829 | | 5/1995 |
| WO | 1998007641 | | 2/1998 |
| WO | 2001018395 | | 3/2001 |
| WO | 2001097101 | | 12/2001 |
| WO | 2002007021 | | 1/2002 |
| WO | 2002074634 | | 9/2002 |
| WO | 2003046782 | | 6/2003 |
| WO | 2006136108 | A1 | 12/2006 |
| WO | 2008104731 | | 9/2008 |
| WO | 2015019377 | | 2/2015 |
| WO | 2015037923 | | 3/2015 |
| WO | 2015044692 | | 4/2015 |
| WO | 2016176464 | A1 | 11/2016 |
| WO | 2017081550 | | 5/2017 |
| WO | 2017163018 | | 9/2017 |
| WO | 2019212853 | | 11/2019 |
| WO | 2019222246 | | 11/2019 |
| WO | 2020014373 | | 1/2020 |
| WO | 2020014374 | | 1/2020 |
| WO | 2020014608 | | 1/2020 |
| WO | 2020014615 | | 1/2020 |
| WO | 2020092790 | | 5/2020 |
| WO | 2020118227 | | 6/2020 |

OTHER PUBLICATIONS

K. L. Choy • G. T. S. Ho • C. K. H. Lee, A RFID-based storage assignment system for enhancing the efficiency of order picking, Published online: Sep. 19, 2014, J Intell Manuf (2017) 28:111-129 (Year: 2014).*

U.S. Appl. No. 16/510,179, filed Jul. 12, 2019, Pending.
U.S. Appl. No. 16/510,151, filed Jul. 12, 2019, Pending.
U.S. Appl. No. 16/507,988, filed Jul. 10, 2019, Pending.
U.S. Appl. No. 16/507,998, filed Jul. 10, 2019, Pending.
International Search Report and Written Opinion for Application No. PCT/US2019/041222, dated Oct. 9, 2019, 12 pages.
International Search Report and Written Opinion for Application No. PCT/US2019/041223, dated Oct. 8, 2019, 10 pages.
International Search Report and Written Opinion for Application No. PCT/US2019/041596, dated Oct. 9, 2019, 13 pages.
International Search Report and Written Opinion for Application No. PCT/US2019/041599, dated Sep. 30, 2019, 12 pages.
Benofficial, Walmart's new Cleveron Pickup Machine in action, 3p, Dec. 21, 2017, Youtube, https://www.youtube.com/watch?v=c6amWJISqH0, retrieved Jul. 8, 2020.
Benofficial, Walmart's new Cleveron pickup machine in action, published Dec. 21, 2017, retrieved from https://www.youtube.com/watch?v=c6amWJISqHOon Jul. 8, 2020, 5 pages.
Boeing Invests in Matternet, Matternet, https://mttr.net/, Jun. 26, 2018.
Channel 8 KLKN-TV, Walmart unveils pick up tower, published Jun. 29, 2018, retrieved from <https://www.youtube.com/watch?v=P8HOrzxT6yE> on Jul. 8, 2020, 2 pages.
Click and collect pickup automation for retail and logistics, Cleveron, https://cleveron.eu/, 2018.
Cleveron AS Automated Parcel Machine PackRobot With Smart Storage System. Product Sheet www.cleveron.eu/packrobot. retrieved from web.archive.org/web/20160910094527/http://www.cleveron.eu/packrobot#videosection. Published at least as early as Sep. 10, 2016.
Cleveron AS, Cleveron 10, published Nov. 15, 2017, retrieved from <https://www.youtube.com/watch?v=gz3WrYa1Zbs> on Jul. 8, 2020, 4 pages.
Cleveron AS, Cleveron highlights the lack of drone delivery legislation at Digital Summit Tallinn, Sep. 26, 2017 https://cleveron.com/news/cleveron-digital-summit; 3p.
Cleveron AS, Cleveron Introduction 2016. published Jun. 14, 2016, retrieved from https://www.youtube.com/watch?v=ly4K_yWCXRg on Jul. 8, 2020, 4 pages.
Cleveron AS, Courier loading operations at Cleveron's Parcel Terminal, published Nov. 6, 2012, retrieved from <https://www.youtube.com/watch?v=qgQ0f-bTQ1o> on Jul. 8, 2020, 2 pages.
Cleveron AS, Multiload system of Cleveron's PackRobot, published Sep. 26, 2012, retrieved from <https://www.youtube.com/watch?v=I31M3V-8saE> on Jul. 8, 2020, 2 pages.
Cleveron AS, Pack robot Cleveron 401,5p, Sep. 15, 2015, You-tube, https://www.youtube.com/watch?v=-iyT2hGrF0c, retrieved Jul. 8, 2020.
Cleveron AS, Pack robot Cleveron 401, published Sep. 15, 2015, retrieved from <https://www.youtube.com/watch?v=-iyT2hGrF0c> on Jul. 8, 2020, 2 pages.
Cleveron AS, Smart POST ETV Feb. 28, 2010, published Mar. 16, 2010, retrieved from <https://www.youtube.com/watch?v=K-hNRJGZkEY> on Jul. 8, 2020, 2 pages.
Cleveron AS; SmartPOST ETV Feb. 28, 2010. Mar. 16, 2010, screenshots 2:25, 2:26, 2:35 2p. https://youtu.be/K-hNRJGZkEY.
Cleveron, Automated parcel Machine PackRobot with smart storage system. Product sheet. Published at least as early as Sep. 20, 2016 at www.cleveron.eu/packrobot; and at https://issuu.com/cleveron/docs/pr16002_1_tooteleht on Apr. 10, 2017.
Cleveron, Packtobot Celveron 401. Sep. 15, 2015. screenshot 0:34 1p. https://www.youtube.com/watch?v=-iyT2hGrF0c.
Hointer, The Hointer Experience. Retrieved online at: https://www.youtube.com/watch?v=i9348H-mw4. 2 pages, Mar. 21, 2014.
Intelligent, Intuitive and Interconnected Vending Machings, SAP Biogs, https://blogs.sap.com/2015/04/16/intelligent-intuitive-and-interconnected-vending-machines/, Apr. 16, 2015.
International Search Report and Written Opinion for Application No. PCT/US2019/032263, dated Aug. 6, 2019, 8 pages.
International Search Report and Written Opinion for PCT/US 2019/29099, dated Aug. 1, 2019, pp. 1-16.

(56) References Cited

OTHER PUBLICATIONS

International Search Report and Written Opinion from related International Patent Application No. PCT/US2019/035814 dated Aug. 22, 2019.
International Search Report and Written Opinion from related International Patent Application No. PCT/US2019/039484 dated Sep. 16, 2019.
International Search Report and Written Opinion from related International Patent Application No. PCT/US2019/044896 dated Oct. 29, 2019.
International Search Report and Written Opinion from related International Patent Application No. PCT/US2019/059197 dated Jan. 17, 2020.
PackRobot: robotics based most efficient parcel terminal, Cleveron, http://cleveron.eu/packrobot/#1490003126030-5c15306f-a9f0, 2017.
Palm, Zara tests out a new kiosk designed to hold packages for customers who make online orders. Retrieved online at: https://www.psfk.com/2018/01/zara-self-service-kiosks-online-orders.html. 6 pages, Jan. 2, 2018.
Peterson, Hayley, Walmart is unleashing 2 key weapons against Amazon in 700 stores, Business Insider, Apr. 5, 2018, 11 pages, retrieved from <https://www.businessinsider.com/walmart-online-pickup-tower-review-2017-8> on Jul. 8, 2020.
Peterson, Walmart is building giant towers to solve the most annoying thing about online ordering. Business insider. Retrieved online at: https://www.businessinsider.in. 8 pages, Jul. 5, 2017.
Simplifying Cloud-Connected Vending Machines, Intelligent Vending with Intel® IoT Retail Gateway, https://www.intel.in/content/www/in/en/embedded/retail/vending/iot-gateway-for-intelligent-vending/overview.html, last viewed Aug. 16, 2018.
Smolnikov, Teleitems Robotic Parcel Terminal Promo, https://www.youtube.com/watch?v=mXL_c5oT9Rc, published Jul. 21, 2017.
Technology Breaking News, Walmart adds 500 Pickup Towers to its stores across the US, published Apr. 27, 2018, retrieved from <https://www.youtube.com/watch?v=wbrw9BEIqrY> on Jul. 8, 2020, 2 pages.

U.S. Appl. No. 16/394,677; Office Action dated Nov. 2, 2020.
U.S. Appl. No. 16/411,917; Notice of Allowance dated May 13, 2021.
U.S. Appl. No. 16/411,917; Office Action dated Jan. 11, 2021.
U.S. Appl. No. 16/433,597; Notice of Allowance dated Mar. 22, 2021.
U.S. Appl. No. 16/454,961; Notice of Allowance dated Feb. 5, 2021.
U.S. Appl. No. 16/507,998; Notice of Allowance dated Jun. 21, 2021.
U.S. Appl. No. 16/510,151; Office Action dated Jun. 15, 2021.
U.S. Appl. No. 16/510,179; Office Action dated Jun. 21, 2021.
U.S. Appl. No. 16/530,390; Office Action dated Feb. 2, 2021.
ZDNet, Walmart rolls out 500 more vending machines for online order pickups | ZDNet, published Jun. 3, 2018, retrieved from <https://www.youtube.com/watch?v=WtSnq9_CExY> on Jul. 8, 2020, 2 pages.
International Search Report and Written Opinion for Application No. PCT/US2019/032893, dated Jul. 29, 2019, 11 pages.
International Search Report and Written Opinion from related International Patent Application No. PCT/US2019/065028 dated Feb. 21, 2020.
U.S. Appl. No. 16/507,988; Non-Final Rejection dated Nov. 19, 2021; (pp. 1-20).
U.S. Appl. No. 16/507,998; Notice of Allowance dated Oct. 12, 2021; (pp. 1-5).
U.S. Appl. No. 16/510,151; Office Action dated Sep. 22, 2021; (pp. 1-21).
U.S. Appl. No. 16/510,179; Non-Final Rejection dated Oct. 28, 2021; (pp. 1-17).
U.S. Appl. No. 16/670,421; Office Action dated Sep. 28, 2021; (pp. 1-17).
International Search Report and Written Opinion for Application No. PCT/US2019/041610, dated Oct. 9, 2019, 10 pages.

* cited by examiner

SYSTEM AND METHOD FOR PRODUCT RECOGNITION AND ASSIGNMENT AT AN AUTOMATED STORAGE AND RETRIEVAL DEVICE

CROSS-REFERENCE TO RELATED PATENT APPLICATIONS

This application claims priority to U.S. Provisional Application No. 62/697,094, filed on Jul. 12, 2018, the content of which is hereby incorporated by reference in its entirety.

BACKGROUND

In conventional retail environments when processing an order, a single identifier (ID), may be used for an item in the order. The ID may be used to identify the item during different stages of processing of the order.

BRIEF DESCRIPTION OF THE DRAWINGS

The accompanying drawings, which are incorporated in and constitute a part of this specification, illustrate one or more embodiments of the invention and, together with the description, help to explain the invention. The drawings are not necessarily to scale, or inclusive of all elements of a system, emphasis instead generally being placed upon illustrating the concepts, structures, and techniques sought to be protected herein. In the drawings.

DETAILED DESCRIPTION

Conventionally some items may be received at a facility with machine-readable identifiers that cannot be understood by an automated storage and retrieval device for the facility. Embodiments improve the ability of the automated storage and retrieval device to recognize multiple types of machine-readable identifiers, map them to existing orders tracked by a fulfillment system, and assign a new ID to enable future location tracking of the item.

In some facilities, items associated with an order may be tracked by an order fulfillment system on a container basis. A container can be a tote, bin, shopping bag, shopping cart, or the like, and may include one or more items. The containers can be different colors depending on the temperature required for storage of items to be picked. Items come in various shapes and sizes, and a large item may serve as its own container. For example, a container ID label may be placed on box of an item (e.g., a television).

In some instances, the container may be a shopping bag. Items such as a toothbrush, toothpaste, and shampoo may use a shopping bag for the container and a container label may be applied on the bag for that order. With this approach, every item of an order may therefore tracked by container and container ID. Each container label is a unique ID. An order can have multiple container IDs associated with it. For example, a TV may get a first ID, and a shopping bag may get a different ID, even though they are part of the same order.

Figure 1:
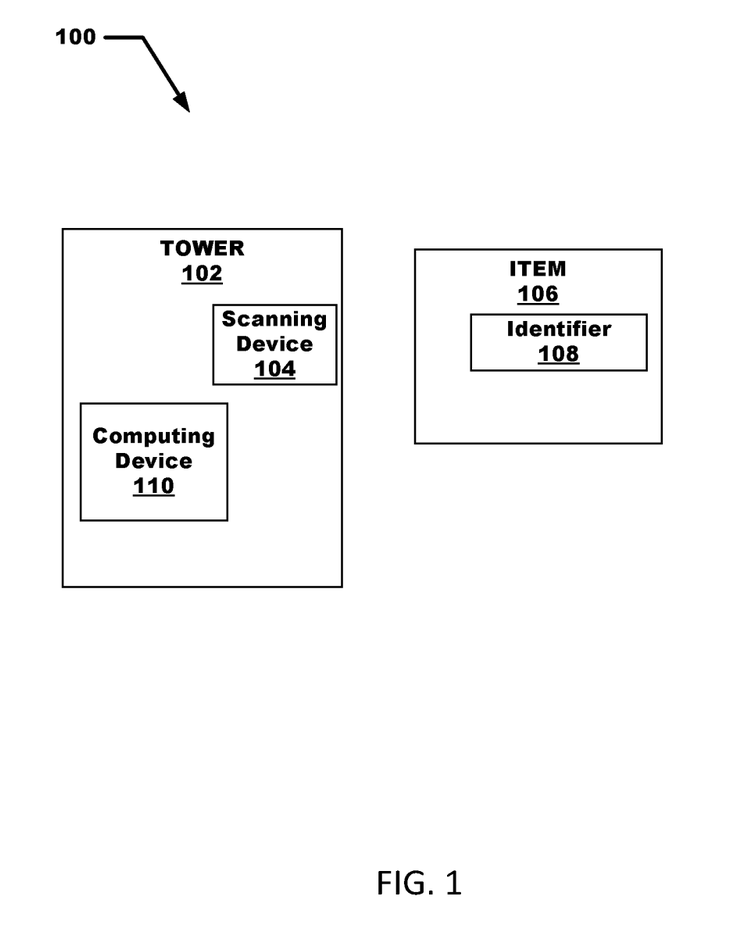
FIG. 1 is a block diagram for a product recognition and assignment system, according to an example embodiment.

Embodiments of the present invention provide a mechanism for product recognition and assignment at an automated storage and retrieval device. Referring to FIG. 1, the system 100 includes an automated storage and retrieval device 102, a scanning device 104 in communication with the automated storage and retrieval device, and a computing device 110 in communication with the scanning device and the automated storage and retrieval device. In some embodiments, the automated storage and retrieval device, may be, but is not limited to, a tower apparatus equipped with automated storage and retrieval mechanisms. In other embodiments, the automated storage and retrieval device may be a drone, Autonomous Guided Vehicle (AGV) or other robotic device equipped with storage space and automated storage and retrieval mechanisms. In one embodiment, the scanning device 104 may be integrated into the automated storage and retrieval device 102. The computing system is configured to execute a recognition module that receives a scanned machine-readable identifier associated with an item received at the automated storage and retrieval device. For example, a facility may receive a shipped item that includes a machine-readable identifier and deliver the item to the automated storage and retrieval device. The recognition module determines if the machine-readable identifier that was scanned is an identification (ID) (referred to herein as a "container ID") recognized by the system that identifies an item for which information is already stored by the system. When the machine-readable identifier is determined not to be a container ID that is recognized by the system the recognition module identifies the machine-readable identifier based on pre-defined criteria and maps the machine-readable identifier to an existing user order using order information for the facility previously stored in one or more databases. For example, the machine-readable identifier may instead be a tracking number or Advanced Shipping Notice (ASN) number that is recognizable by the system and which is indexed to an existing order. Once the item is identified, it can be mapped to an existing order whose details were previously saved by the system. Following identification, the recognition module creates a container ID for the item to allow future tracking of the item. The item is stored in the automated storage and retrieval device using the created container ID that identifies the item and its location within the automated storage and retrieval device.

In one embodiment, items are taken directly off a delivery vehicle and routed directly to an automated storage and retrieval device, such as but not limited to a tower apparatus, without going through a traditional receiving process involving human inspection and the manual printing of container IDs for each item. For example, embodiments allow the scanner in the automated storage and retrieval device to read and process multiple types of machine-readable identifiers including a container ID, a tracking number, or an ASN. It will be appreciated that in other embodiments additional types of machine-readable identifiers not specifically listed herein may be read in the absence of a container ID by the automated storage and retrieval device so as to allow the mapping of the item to existing order information and the assignment of a container ID by the automated storage and retrieval device. It should be appreciated that when an item arrives at the automated storage and retrieval device and includes a container ID that is read, nothing is changed, and the processing of the item continues with the item's storage in the automated storage and retrieval device and the updating of its location in the system. The tower or other automated storage and retrieval device understands where the container ID is held, and is available for retrieval when a user arrives for pickup.

Figure 2:
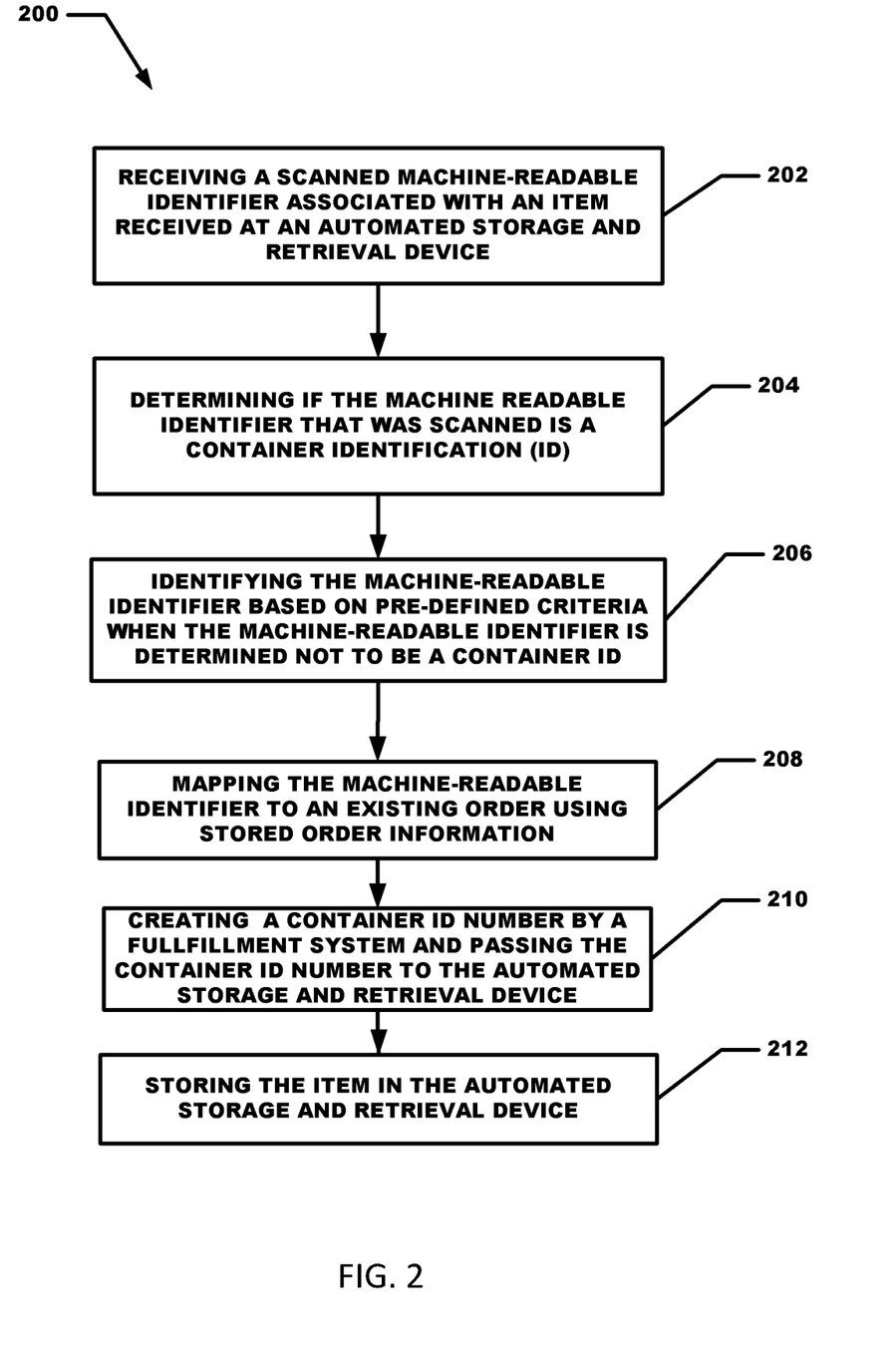
FIG. 2 is a flowchart illustrating an exemplary method for product recognition and assignment according to an example embodiment.

FIG. 2 is a flowchart illustrating an exemplary method 200 for product recognition and assignment. A scanned machine-readable identifier associated with an item is received at an automated storage and retrieval device (step 202). The item may be from another retail facility, a vendor, or the like. The item may have one or more barcodes on it.

A determination is made regarding whether the machine-readable identifier that was read is a container ID (step 204). When the machine-readable identifier is a container ID, the item is processed using the container ID.

When the machine-readable identifier is not a container ID, the machine readable-identifier is identified based on pre-defined criteria (step 206). For example, the machine-readable identifier may be one of an ASN number or a tracking number whose format the recognition module has been programmed to recognize.

The machine-readable identifier is mapped to an existing order using stored number information (step 208). A container ID number is created by an order fulfillment system and passed to the automated storage and retrieval device (step 210).

The item is stored in the automated storage and retrieval device (step 210). Once the order is completed (all items have been picked), the customer is notified that the order is ready to be picked up. The customer may provide credentials to the tower and is able to access the ordered items.

Figure 3:
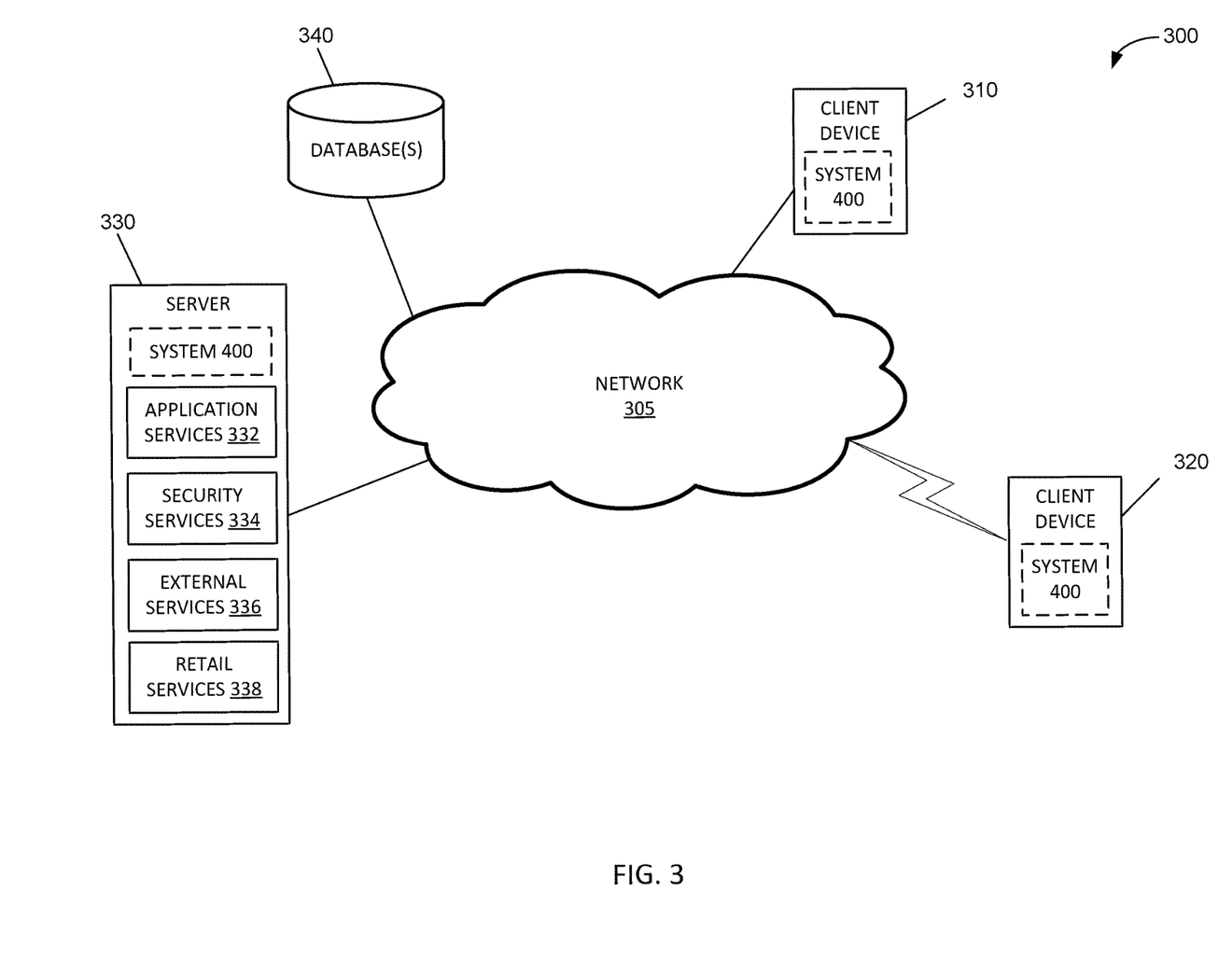
FIG. 3 is a diagram of an exemplary network environment suitable for a product recognition and assignment system of exemplary embodiments.

FIG. 3 illustrates a network diagram depicting a system 300 for implementing the product recognition and assignment system, according to an example embodiment. The system 300 can include a network 305, multiple client devices, for example, client device 310, client device 320, a server 330, and database(s) 340. Each of the client devices 310, 320, server 330, and database(s) 340 is in communication with the network 305.

In an example embodiment, one or more portions of network 305 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

The client devices 310, 320 may comprise, but are not limited to, mobile devices, hand-held devices, wireless devices, portable devices, wearable computers, cellular or mobile phones, portable digital assistants (PDAs), smart phones, smart watches, tablets, ultrabooks, netbooks, laptops, desktops, multi-processor systems, microprocessor-based or programmable consumer electronics, and the like. Each of client devices 310, 320 may connect to network 305 via a wired or wireless connection. In an example embodiment, the client devices 310, 320 may perform one or more of the functionalities of the product recognition and assignment system described herein, or transmit data or signals to the product recognition and assignment system described herein. The client device 310, 320 can include one or more components of computing device 400 of FIG. 4.

In an example embodiment, the targeted advertising system 100 may be included at least in part on the client device 310, 320, and the client device 310, 320 performs one or more of the functionalities of the system described herein. In an example embodiment, the product recognition and assignment system may be included at least in part on the server 330, and the server 330 performs one or more of the functionalities of the product recognition and assignment system described herein.

The database(s) 340 comprise one or more storage devices for storing data and/or instructions (or code) for use by the server 330 and/or the client devices 310, 320. Each of the database(s) 340 and the server 330 is connected to the network 305 via a wired connection. Alternatively, one or more of the database(s) 340 and server 330 may be connected to the network 305 via a wireless connection. The server 330 comprises one or more computers or processors configured to communicate with the client devices 310, 320 via network 305. The server 330 can include one or more components of device 400 of FIG. 4. Server 330 hosts one or more software systems, applications or websites, including one or more components of the product recognition and assignment system 100 described herein and/or facilitates access to the content of database(s) 340.

In an example embodiment, the server 330 also includes various software services that facilitate the functionalities of the product recognition and assignment system. Database(s) 340 and server 330 may be located at one or more geographically distributed locations from each other or from client devices 310, 320. Alternatively, database(s) 340, 345 may be included within server 330. Server 330 includes software and applications for application services 332, security services 334, external services 336, and retail services 338.

Figure 4:
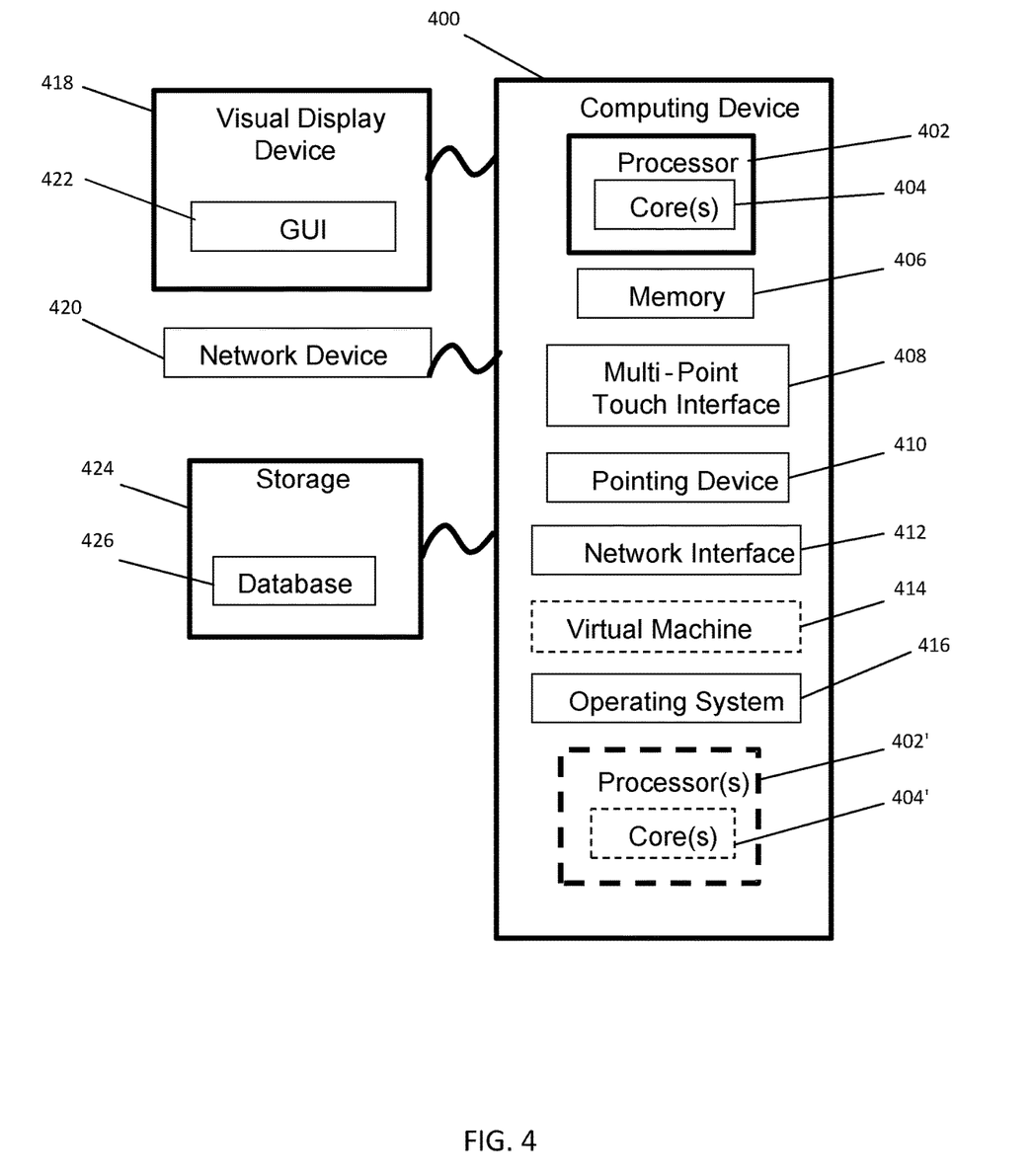
FIG. 4 is a block diagram of an exemplary computing device that may be used to implement exemplary embodiments described herein.

FIG. 4 is a block diagram of an exemplary computing device 400 that can be used to perform one or more steps of the methods provided by exemplary embodiments. For example, computing device 400 may be the client device 310, 320 and the server 330 as described in FIG. 3. The computing device 400 includes one or more non-transitory computer-readable media for storing one or more computer-executable instructions or software for implementing exemplary embodiments. The non-transitory computer-readable media can include, but are not limited to, one or more types of hardware memory, non-transitory tangible media (for example, one or more magnetic storage disks, one or more optical disks, one or more USB flashdrives), and the like. For example, memory 406 included in the computing device 400 can store computer-readable and computer-executable instructions or software for implementing exemplary embodiments. The computing device 400 also includes processor 402 and associated core 404, and optionally, one or more additional processor(s) 402' and associated core(s) 404' (for example, in the case of computer systems having multiple processors/cores), for executing computer-readable and computer-executable instructions or software stored in the memory 406 and other programs for controlling system hardware. Processor 402 and processor(s) 402' can each be a single core processor or multiple core (404 and 404') processor.

Virtualization can be employed in the computing device 400 so that infrastructure and resources in the computing device can be shared dynamically. A virtual machine 414 can be provided to handle a process running on multiple processors so that the process appears to be using only one computing resource rather than multiple computing resources. Multiple virtual machines can also be used with one processor.

Memory 406 can include a computer system memory or random access memory, such as DRAM, SRAM, EDO RAM, and the like. Memory 406 can include other types of memory as well, or combinations thereof. An individual can interact with the computing device 400 through a visual display device 418, such as a touch screen display or computer monitor, which can display one or more user interfaces 422 for receiving data from the individual (e.g., order data and travel data). The visual display device 418 can also display other aspects, elements and/or information or data associated with exemplary embodiments. The computing device 400 can include other I/O devices for receiving input from a individual, for example, a keyboard or another suitable multi-point touch interface 408, a pointing device 410 (e.g., a pen, stylus, mouse, or trackpad). The keyboard 408 and the pointing device 410 can be coupled to the visual display device 418. The computing device 400 can include other suitable conventional I/O peripherals.

The computing device 400 can also include one or more storage devices 424, such as a hard-drive, CD-ROM, or other computer readable media, for storing data and computer-readable instructions and/or software, such as one or more modules of the system 100 shown in FIG. 1 that implements exemplary embodiments of the product recognition and assignment system as described herein, or portions thereof, which can be executed to generate user interface 422 on display 418. Exemplary storage device 424 can also store one or more databases 426 for storing suitable information required to implement exemplary embodiments. The databases can be updated by an individual or automatically at a suitable time to add, delete, or update one or more items in the databases. Exemplary storage device 424 can store one or more databases 426 for storing provisioned data, and other data/information used to implement exemplary embodiments of the systems and methods described herein.

The computing device 400 can include a network interface 412 configured to interface via one or more network devices 420 with one or more networks, for example, Local Area Network (LAN), Wide Area Network (WAN) or the Internet through a variety of connections including, but not limited to, standard telephone lines, LAN or WAN links (for example, 802.11, T1, T3, 46 kb, X.25), broadband connections (for example, ISDN, Frame Relay, ATM), wireless connections, controller area network (CAN), or some combination of any or all of the above. The network interface 412 can include a built-in network adapter, network interface card, PCMCIA network card, card bus network adapter, wireless network adapter, USB network adapter, modem or another device suitable for interfacing the computing device 400 to a type of network capable of communication and performing the operations described herein. Moreover, the computing device 400 can be a computer system, such as a workstation, desktop computer, server, laptop, handheld computer, tablet computer (e.g., the iPad® tablet computer), mobile computing or communication device (e.g., the iPhone® communication device), or other form of computing or telecommunications device that is capable of communication and that has sufficient processor power and memory capacity to perform the operations described herein.

The computing device 400 can run an operating system 416, such as versions of the Microsoft® Windows® operating systems, the different releases of the Unix and Linux operating systems, a version of the MacOS® for Macintosh computers, an embedded operating system, a real-time operating system, an open source operating system, a proprietary operating system, an operating systems for mobile computing devices, or another operating system capable of running on the computing device and performing the operations described herein. In exemplary embodiments, the operating system 416 can be run in native mode or emulated mode. In an exemplary embodiment, the operating system 416 can be run on one or more cloud machine instances.

The description is presented to enable a person skilled in the art to create and use a computer system configuration and related method and systems for product recognition and assignment. Various modifications to the example embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention may be practiced without the use of these specific details. In other instances, well-known structures and processes are shown in block diagram form in order not to obscure the description of the invention with unnecessary detail. Thus, the present disclosure is not intended to be limited to the embodiments shown, but is to be accorded the widest scope consistent with the principles and features disclosed herein.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps can be replaced with a single element, component, or step. Likewise, a single element, component, or step can be replaced with a plurality of elements, components, or steps that serve the same purpose. Moreover, while exemplary embodiments have been shown and described with references to particular embodiments thereof, those of ordinary skill in the art will understand that various substitutions and alterations in form and detail can be made therein without departing from the scope of the invention. Further still, other aspects, functions, and advantages are also within the scope of the invention.

Exemplary flowcharts have been provided herein for illustrative purposes and are non-limiting examples of methods. One of ordinary skill in the art will recognize that exemplary methods can include more or fewer steps than those illustrated in the exemplary flowcharts, and that the steps in the exemplary flowcharts can be performed in a different order than the order shown in the illustrative flowcharts.

Having described certain embodiments, which serve to illustrate various concepts, structures, and techniques sought to be protected herein, it will be apparent to those of ordinary skill in the art that other embodiments incorporating these concepts, structures, and techniques may be used. Elements of different embodiments described hereinabove may be combined to form other embodiments not specifically set forth above and, further, elements described in the context of a single embodiment may be provided separately or in any suitable sub-combination. Accordingly, it is submitted that the scope of protection sought herein should not be limited to the described embodiments but rather should be limited only by the spirit and scope of the following claims.

What is claimed is:

1. A product identifier recognition and assignment system, the system comprising:
   an automated storage and retrieval device;
   a scanning device in communication with the automated storage and retrieval device;

one or more databases holding order information for a plurality of orders; and a computing device in communication with the scanning device and the automated storage and retrieval device, the computing device configured to execute a recognition module, wherein the recognition module, when executed:

receives a scanned machine-readable identifier associated with an item received at the automated storage and retrieval device;

determines if the scanned machine-readable identifier is a container identification (ID) recognized by the system as being already stored by the system to identify the item; and when the scanned machine-readable identifier is determined not to be a container ID recognized by the system as being already stored by the system to identify the item:

identifies the scanned machine-readable identifier based on pre-defined criteria;

maps the scanned machine-readable identifier to an existing order using the order information;

creates a container ID for the item to be tracked by a fulfillment system, the created container ID identifying both the item and the storage location of the item within the automated storage and retrieval device; and stores the item in the automated storage and retrieval device using the created container ID.

2. The system of claim 1 wherein the scanner is integrated into the automated storage and retrieval device.

3. The system of claim 2 wherein the automated storage and retrieval device is a tower.

4. The system of claim 1 wherein when the machine-readable identifier is one of an Advanced Shipping Notice (ASN) number and a tracking number.

5. The system of claim 1 wherein the automated storage and retrieval device provides access to the item by a customer.

6. The system of claim 5 wherein a user provides credentials to the automated storage and retrieval device to initiate retrieval of the item.

7. The system of claim 1 wherein the automated storage and retrieval device is one of a drone and an Autonomous Guided Vehicle (AGV).

8. A computer-implemented method for product identifier recognition and assignment, the method comprising:

receiving a scanned machine-readable identifier associated with an item received at an automated storage and retrieval device;

determining that the scanned machine-readable identifier is not a container identification (ID) recognized by the system as being already stored by the system to identify the item; and when the scanned machine-readable identifier is determined not to be a container ID recognized by the system as being already stored by the system to identify the item:

identifying the scanned machine-readable identifier based on pre-defined criteria;

mapping the scanned machine-readable identifier to an existing order using stored order information;

creating a container ID for the item to be tracked by a fulfillment system, the created container ID identifying both the item and a storage location of the item within the automated storage and retrieval device; and storing the item in the automated storage and retrieval device using the created container ID.

9. The method of claim 8 wherein the scanner is integrated into the automated storage and retrieval device.

10. The method of claim 9 wherein the automated storage and retrieval device is a tower.

11. The method of claim 8 wherein when the machine-readable identifier is one of an Advanced Shipping Notice (ASN) number and a tracking number.

12. The method of claim 8 further comprising providing access by the automated storage and retrieval device to the item by a customer.

13. The method of claim 12 further comprising a user providing credentials to the automated storage and retrieval device to initiate retrieval of the item.

14. The method of claim 8 wherein the automated storage and retrieval device is one of a drone and an Autonomous Guided Vehicle (AGV).

15. A non-transitory machine-readable medium storing instructions executable by a computing device, wherein execution of the instructions causes the computing device to implement a method for product identifier recognition and assignment, the method comprising:

receiving a scanned machine-readable identifier associated with an item received at an automated storage and retrieval device;

determining if the scanned machine-readable identifier is a container identification (ID) recognized by the system as being already stored by the system to identify the item; and when the scanned machine-readable identifier is determined not to be a container ID recognized by the system as being already stored by the system to identify the item:

identifying the scanned machine-readable identifier based on pre-defined criteria;

mapping the scanned machine-readable identifier to an existing order using stored order information;

creating a container ID for the item to be tracked by a fulfillment system, the created container ID identifying both the item and a storage location of the item within the automated storage and retrieval device; and storing the item in the automated storage and retrieval device using the created container ID.

16. The medium of claim 15 further comprising instructions wherein the automated storage and retrieval device is a tower.

17. The medium of claim 15 further comprising instructions wherein when the machine-readable identifier is one of an Advanced Shipping Notice (ASN) number and a tracking number.

18. The medium of claim 15 further comprising instructions providing access by the automated storage and retrieval device to the item by a customer.

19. The medium of claim 18 further comprising instructions for verifying credentials to the automated storage and retrieval device to initiate retrieval of the item.

20. The medium of claim 15 further comprising instructions wherein the automated storage and retrieval device is one of a drone and an Autonomous Guided Vehicle (AGV).

* * * * *